United States Patent
Katakura et al.

(10) Patent No.: US 7,411,787 B2
(45) Date of Patent: Aug. 12, 2008

(54) STORAGE CONTROL DEVICE

(75) Inventors: Yasuyuki Katakura, Odawara (JP); Kenichi Miyamoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 208 days.

(21) Appl. No.: 11/347,311

(22) Filed: Feb. 6, 2006

(65) Prior Publication Data

US 2007/0127207 A1    Jun. 7, 2007

(30) Foreign Application Priority Data

Dec. 2, 2005 (JP) ............... 2005-349891

(51) Int. Cl.
*H05K 7/20* (2006.01)
(52) U.S. Cl. ................. 361/695; 454/184
(58) Field of Classification Search ............ None
See application file for complete search history.

(56) References Cited

U.S. PATENT DOCUMENTS

| | | | | |
|---|---|---|---|---|
| 4,774,631 A | * | 9/1988 | Okuyama et al. | 361/695 |
| 5,136,464 A | * | 8/1992 | Ohmori | 361/694 |
| 5,544,012 A | * | 8/1996 | Koike | 361/695 |
| 7,133,282 B2 | * | 11/2006 | Sone | 361/685 |
| 2004/0264131 A1 | * | 12/2004 | Nishiyama et al. | 361/694 |
| 2005/0286221 A1 | * | 12/2005 | Yamana et al. | 361/687 |
| 2006/0139880 A1 | * | 6/2006 | Tate | 361/697 |

FOREIGN PATENT DOCUMENTS

| | | |
|---|---|---|
| JP | 8-273345 | 10/1996 |
| JP | 2001-307474 | 11/2001 |
| JP | 2002-232177 | 8/2002 |

* cited by examiner

*Primary Examiner*—Gregory D Thompson
(74) *Attorney, Agent, or Firm*—Mattingly, Stanger, Malur & Brundidge, P.C.

(57) ABSTRACT

A first section, a second section, and a third section are provided. A plurality of NAS head substrates are mounted in the first section, arranged along the height direction, and each oriented horizontally. A plurality of logical substrates are mounted in the second section, arranged along the width direction. And power supplies are mounted in the third section. First through third fans are provided respectively corresponding to the first through the third sections, and the flow conduit for the air blown by each of the fans is independent from the flow conduits for the air blown by other fans.

31 Claims, 9 Drawing Sheets

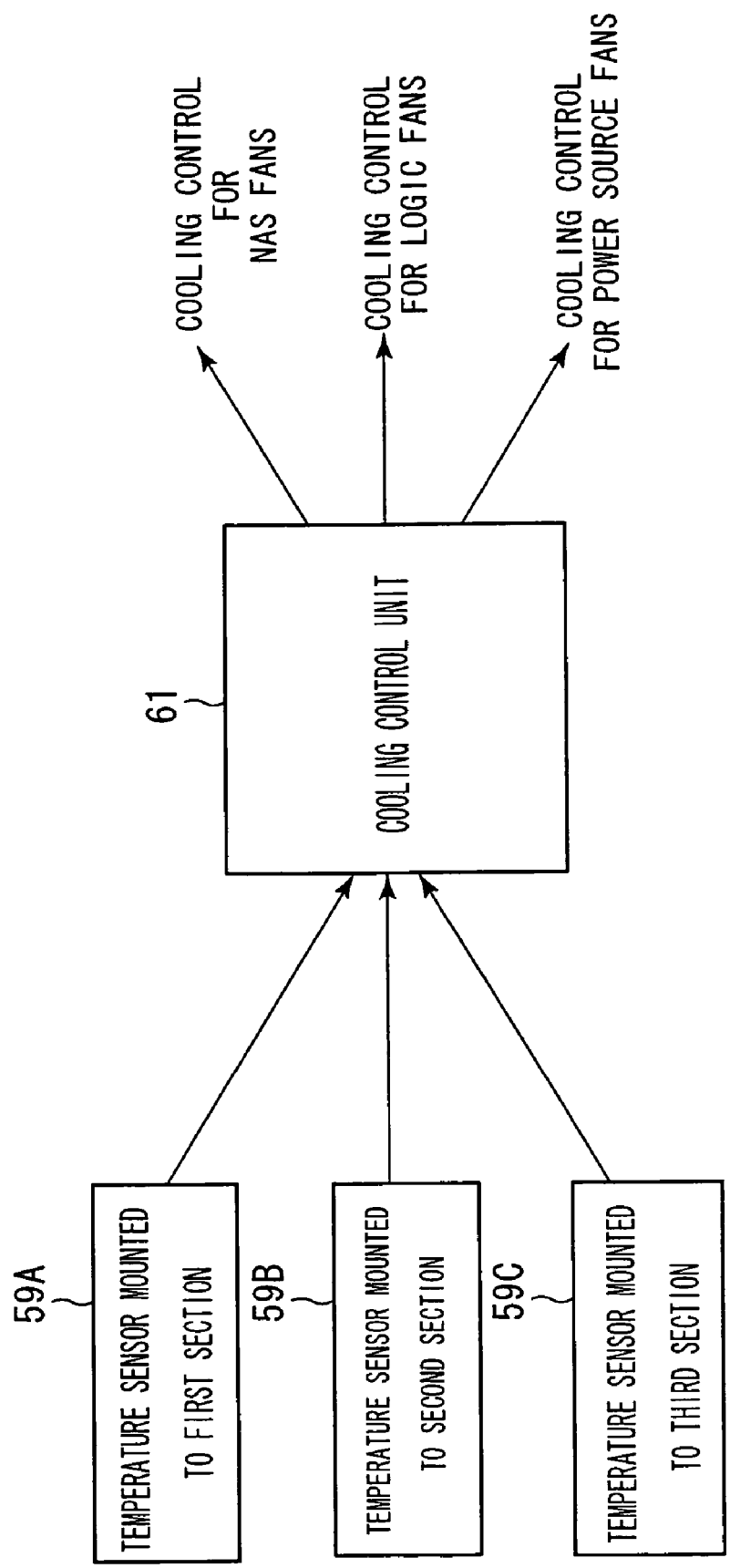

STORAGE CONTROL DEVICE

CROSS-REFERENCE TO PRIOR APPLICATION

This application relates to and claims priority from Japanese Patent Application No. 2005-349891 filed on Dec. 2, 2005, the entire disclosure of which is incorporated herein by reference.

BACKGROUND OF THE INVENTION

1. Field of the Invention

The present invention relates to a technique for cooling various subjects for cooling within a storage control device.

2. Description of the Related Art

As storage control devices equipped with cooling mechanisms there are, for example, the storage control devices disclosed in Japanese Patent Laid-Open Publication 2002-232177, Japanese Patent Laid-Open Publication 2001-307474, and Japanese Patent Laid-Open Publication Heisei 8-273345.

SUMMARY OF THE INVENTION

It is sometimes demanded in, for example, a storage control device, to implement a greatly increased capacity in a limited space (for example, to provide large storage capacity and/or to provide high speed functioning).

As one method for implementing this, for example, a method is considered of cooling subjects for cooling of a plurality of types within the storage control device with a single cooling mechanism (in concrete terms, for example, cooling them with air which is blown by a single fan).

However, with this method, there is a fear that it will not definitely be possible sufficiently to cool each of these subjects for cooling of a plurality of types. In concrete terms, if for example the cooling mechanism is provided with a fan, it is considered that the degree of cooling will be different, according as to which type of subject for cooling is present at the upstream side of the flow of air being blown by this fan, and which at its downstream side.

Furthermore, in this method, if for example the cooling mechanism is provided with a fan, when an attempt is made sufficiently to cool all the types of subject for cooling, there is a requirement for setting the number of rotations of the fan per unit time high, and as a result a noise problem occurs.

SUMMARY OF THE INVENTION

Accordingly, an object of the present invention is to enhance the cooling efficiency of a storage control device.

Other objects of the present invention will become clear from the following explanation.

The storage control device according to the present invention includes two or more groups of subjects for cooling, including m subjects for cooling of the same type among M subjects for cooling (where m is a integer greater than or equal to 2, and M>m), and two or more cooling mechanisms which respectively correspond to the two or more groups of subjects for cooling. Each of the cooling mechanisms is a mechanism for cooling the subjects for cooling included in its corresponding group of subjects for cooling, and is independent from other cooling mechanisms.

Here, if for example each of the cooling mechanisms includes a cooling unit (for example a fan) and a cooling flow conduit (for example, a flow conduit for air which is driven by the fan), then each of the cooling mechanisms can be made to be independent from other cooling mechanisms by making each of the cooling units and each of the cooling flow conduits separate from the other cooling units and the other cooling flow conduits. It should be understood that making each of the cooling flow conduits separate from the other cooling flow conduits of course includes the possibility that the cooling flow conduits should intersect one another, but also includes the possibility that they may intersect. In other words, making each cooling flow conduit separate from the other cooling flow conduits may mean that the cooling flow conduits are made so as not to be common more than a predetermined distance.

With a first embodiment of the present invention: air is sucked into the storage control device by each of the cooling mechanisms, and the sucked in air cools the subjects for cooling included in the group of subjects for cooling corresponding to each of the cooling mechanisms, and is then expelled to the exterior of the storage control device; and the air flow conduit for each cooling mechanism is independent from the flow conduits for the air sucked in by the other cooling mechanisms.

With a second embodiment of the present invention, in the two or more groups of subjects for cooling, there are included a first, a second, and a third group of subjects for cooling. First subjects for cooling which are cooled by a first cooling mechanism corresponding to the first group of subjects for cooling are NAS head substrates or the storage devices. Second subjects for cooling which are cooled by a second cooling mechanism corresponding to the second group of subjects for cooling are logical substrates which are separate from the NAS heads. Third subjects for cooling which are cooled by a third cooling mechanism corresponding to the third group of subjects for cooling are power supplies. The storage control device is divided, from above to below, into a plurality of sections. And, in this plurality of sections, there are included: a first section in which a plurality of the NAS head substrates or the storage devices are mounted; a second section in which a plurality of the logical substrates are mounted; and a third section in which the power supplies are mounted. With this second embodiment, it is possible to cool, in particular, the heat generation portion of each subject for cooling (for example, a CPU which is mounted on a substrate).

With a third embodiment of the present invention, in the second embodiment, the NAS head substrates are mounted horizontally in the first section. And the first cooling mechanism sucks in air from the exterior of the storage control device via the front surface of the storage control device, and expels the sucked in air to the exterior of the storage control device from the rear surface of the storage control device.

With a fourth embodiment of the present invention, in the third embodiment, a plurality of plate shaped NAS units can be mounted in the first section. Each of the NAS units is mounted horizontally, and is provided with one or more NAS heads and a first fan for cooling the one or more NAS heads. And the first fan is provided more toward the front side, or the rear side, of the storage control device, than the one or more NAS heads.

With a fifth embodiment of the present invention, in the second embodiment, in the first section, an input device for a user to input information to the storage control device, or a maintenance terminal incorporating one, is mounted so as to be shiftable both in the rearward direction and the forward direction of the storage control device.

With a sixth embodiment of the present invention, in the fifth embodiment, the input device or maintenance terminal is positioned at a height at which the user can easily input the information.

With a seventh embodiment of the present invention, in the second embodiment, the second section is positioned below the first section. And, in the second section, a plurality of the logical substrates are arranged along the width direction of the storage control device, with each of the logical substrates being mounted vertically. The second cooling mechanism sucks in air from the exterior of the storage control device via at least one of the front surface and the rear surface of the storage control device, and blows the sucked in air from the lower side of the plurality of logical substrates to their tops. And, on at least one of the right side and the left side of the plurality of NAS head substrates, a flow conduit is provided along which the air which has flowed to the tops of the plurality of logical substrates flows.

With an eighth embodiment of the present invention, in the seventh embodiment, between the first section and the plurality of logical substrates, there is mounted a second fan which sucks in air from the lower side, where the plurality of logical substrates are present, and expels the air upwards. And the air which has been expelled by the second fan passes along the flow conduit which is provided on at least one of the right side and the left side of the plurality of NAS head substrates.

With a ninth embodiment of the present invention, in the eighth embodiment, a guide member is provided for guiding the air which has been expelled by the second fan to an inlet of the flow conduit.

With a tenth embodiment of the present invention, in the ninth embodiment, the third cooling mechanism can suck in air from the exterior of the storage control device via the front surface of the storage control device, and can expel the sucked in air to the exterior of the storage control device from the rear surface of the storage control device. In concrete terms, for example, in the third section, a subject for cooling separate from the power supplies is mounted on the front side of the storage control device, with the power supplies being mounted more to the rear side than the separate subject for cooling. And the third cooling mechanism may cool the power supplies with air which has been sucked in from a different location than the location at which the separate subject for cooling is located.

With an eleventh embodiment of the present invention, in the second embodiment, the second section is above the third section. And the first section is above the second section.

With a twelfth embodiment of the present invention, in the second embodiment, a first circuit board is provided in the first section, parallel or substantially parallel to the front surface of the storage control device. The NAS head substrates are oriented horizontally and connected to the first circuit board. On the first circuit board, the plurality of NAS head substrates are arranged along the height direction of the storage control device. A second circuit board is provided in the second section, parallel or substantially parallel to the front surface of the storage control device. The logical substrates are oriented vertically and connected to both surfaces of the second circuit board. On the second circuit board, the plurality of logical substrates are arranged along the width direction of the storage control device. A third circuit board is provided in the third section, parallel or substantially parallel to the front surface of the storage control device. And the power supplies are connected to the third circuit board. The wiring on the second circuit board is made to be finer than the wiring on the first circuit board and on the third circuit board.

With a thirteenth embodiment of the present invention, the two or more groups of subjects for cooling and the two or more cooling mechanisms are provided within a chassis of a predetermined size.

With a fourteenth embodiment of the present invention, in the second embodiment, the second section is above the third section. The first section is above the second section. The NAS head substrates are mounted horizontally in the first section. The first cooling mechanism sucks in air from the exterior of the storage control device via the front surface of the storage control device, and expels the sucked in air to the exterior of the storage control device from the rear surface of the storage control device. The plurality of logical substrates are arranged in the second section along the width direction of the storage control device, and each of the logical substrates is mounted vertically. The second cooling mechanism sucks in air from the exterior of the storage control device via at least one of the front surface and the rear surface of the storage control device, and blows the sucked in air from the lower side of the plurality of logical substrates to their tops. On at least one of the right side and the left side of the plurality of NAS head substrates, a flow conduit is provided along which the air which has flowed to the tops of the plurality of logical substrates flows. And the third cooling mechanism sucks in air from the exterior of the storage control device via the front surface of the storage control device, and expels the sucked in air to the exterior of the storage control device from the rear surface of the storage control device.

With a fifteenth embodiment of the present invention, in the second embodiment, a temperature sensor is provided to or in the vicinity of at least one of the first section, the second section, and the third section, and, based on the temperature which has been detected by the temperature sensor, the NAS head substrates or the logical substrates are able to control a cooling mechanism corresponding to the detected temperature.

With a sixteenth embodiment of the present invention, in the second embodiment, at least one of the first section, the second section, and the third section comprises a tubular box; a surface, which is a surface of the tubular box, and which is parallel to at least one of the front surface and the rear surface of the storage control device, is open; and a subject for cooling is mounted via the open surface.

With a seventeenth embodiment of the present invention, in the second embodiment, the cooling mechanisms are provided so that air which has been expelled to the exterior of the storage control device by each of the cooling mechanisms, and whose temperature is higher than that of the sucked in air, is not sucked in by the other cooling mechanisms.

BRIEF DESCRIPTION OF THE DRAWINGS

FIG. 9 is an explanatory figure showing an example of a cooling control method for a second embodiment of the present invention.

DESCRIPTION OF THE PREFERRED EMBODIMENTS

In the following, various preferred embodiments of the storage control device according to the present invention will now be explained with reference to the figures.

Embodiment 1

Figure 1:
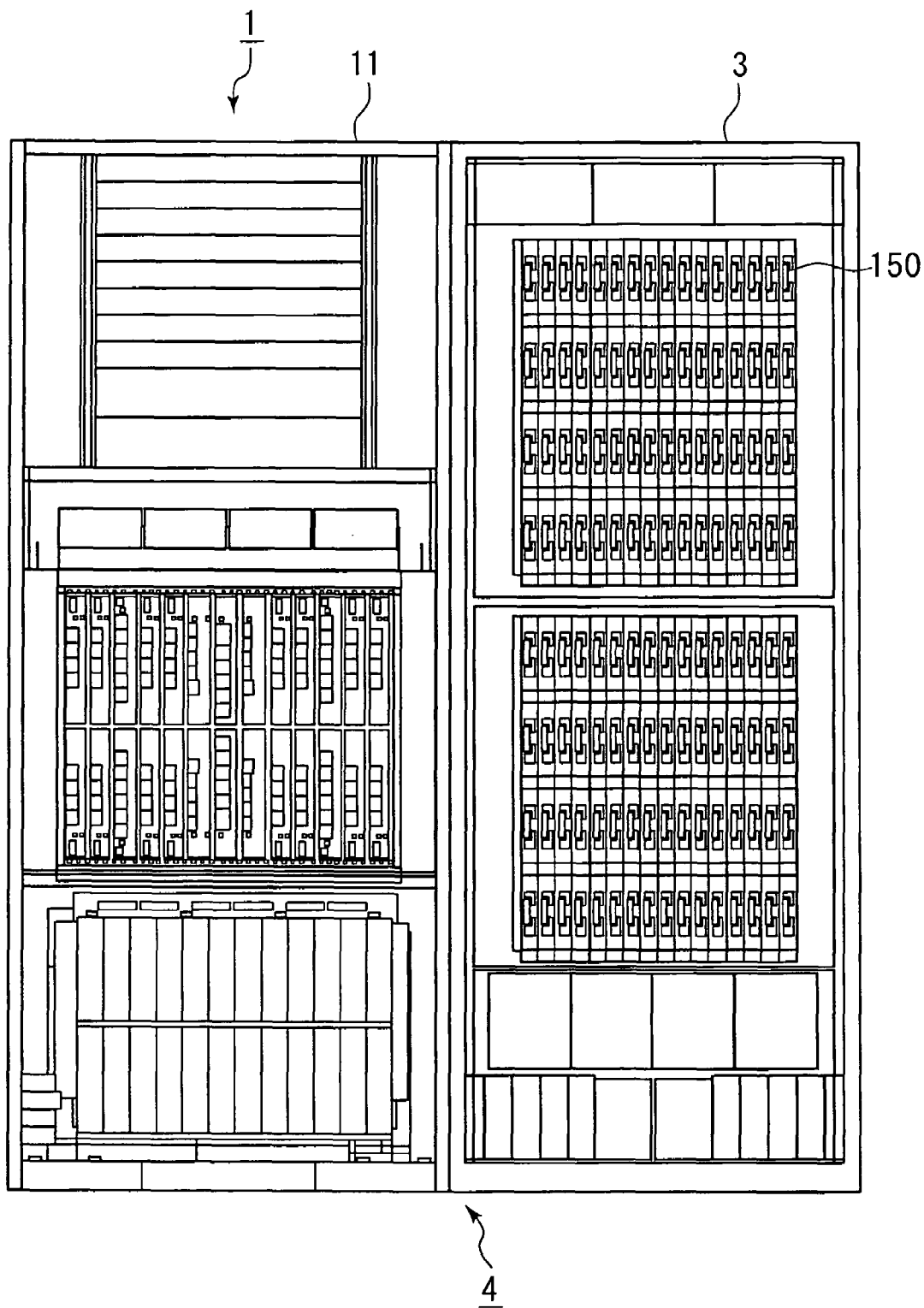
FIG. 1 is an elevation view of an example of a storage device system incorporating a storage control device according to the first embodiment of the present invention.

FIG. 1 is an elevation view of an example of a storage device system incorporating a storage control device according to the first embodiment of the present invention.

The storage device system 4 comprises a storage control device 1 which controls a storage device 150. This storage control device 1 may be constructed using a chassis 11. And the storage device 150 may be mounted on another chassis 3. In the following, for convenience, the chassis 11 will be termed the "main chassis 11", and the chassis 3 will be termed the "extension chassis 3".

A plurality of storage devices 150 may be mounted in the extension chassis 3, so as to be arrayed along both the width direction and the vertical direction of the extension chassis 3. These storage devices 150 may be of any types, and, in this first embodiment, hard disk drives may be employed. The storage devices 150 are shaped as rectangular parallelepipeds, and may be mounted vertically (in other words, upright (or the storage devices 150 may be mounted horizontally, in other words on their sides). This type of extension chassis 3 is not limited to being one in number; two or more may also be fitted. By doing this, it is possible to increase the storage capacity of the storage device system 4.

It should be understood that the upper surfaces, the lower surfaces, and the side surfaces of the extension chassis 3 and the main chassis 11 may be closed, while their front and rear surfaces may be opened, so as to constitute a casing. Furthermore, although this feature is not shown in the figure, cover plates may be provided on the front surface and/or the rear surface of at least one of the extension chassis 3 and the main chassis 11, so as substantially entirely to cover this surface. Air passage portions may be provided in these cover plates for sucking in air from the exterior of the storage device system 4 to its interior, or for expelling air from the interior of the storage device system 4 to the exterior. These air passage portions may, for example, consist of a large number of holes.

Figure 2:
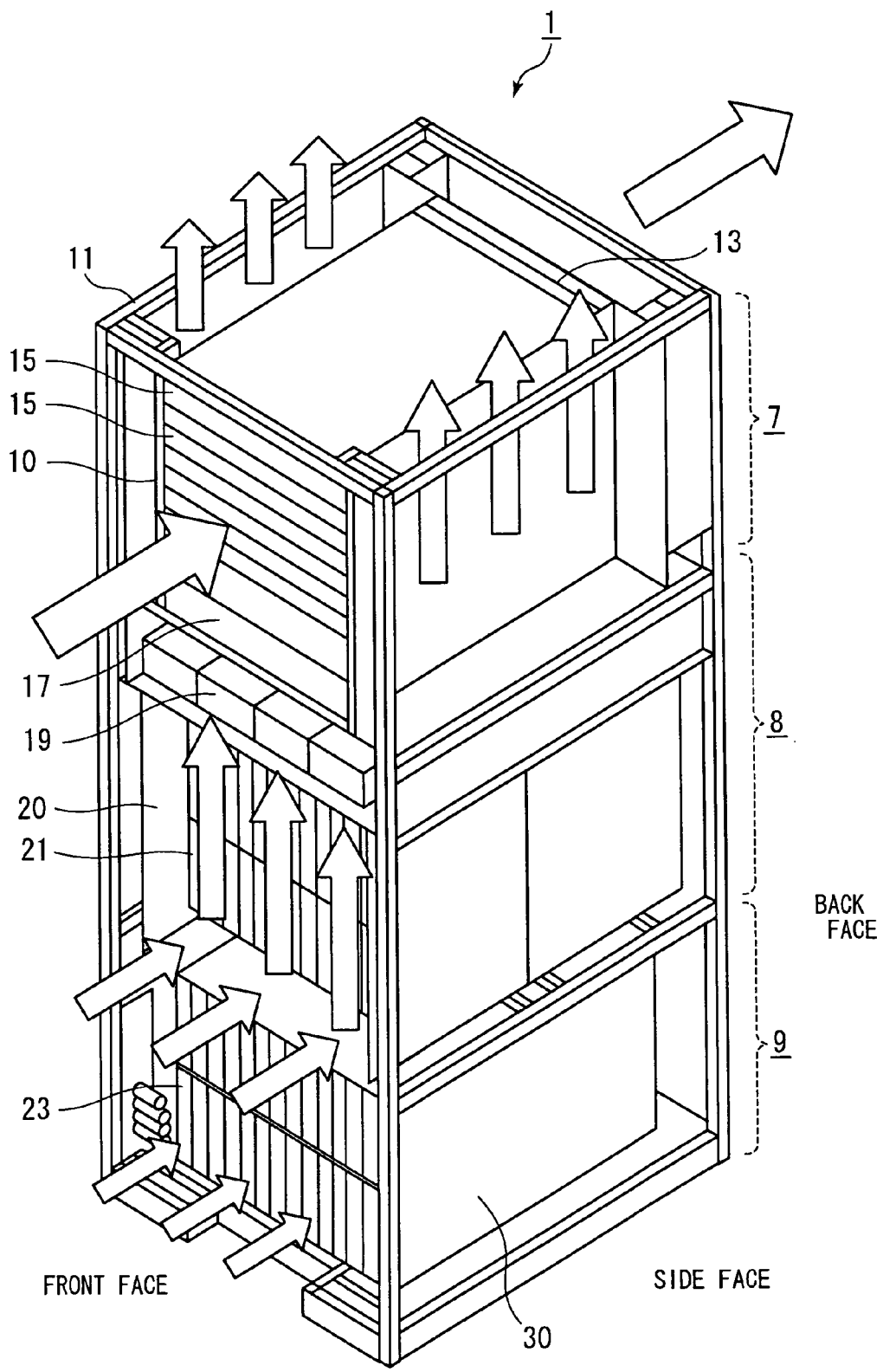
FIG. 2 is a perspective view of the storage control device 1 as seen from its front.
Figure 3:
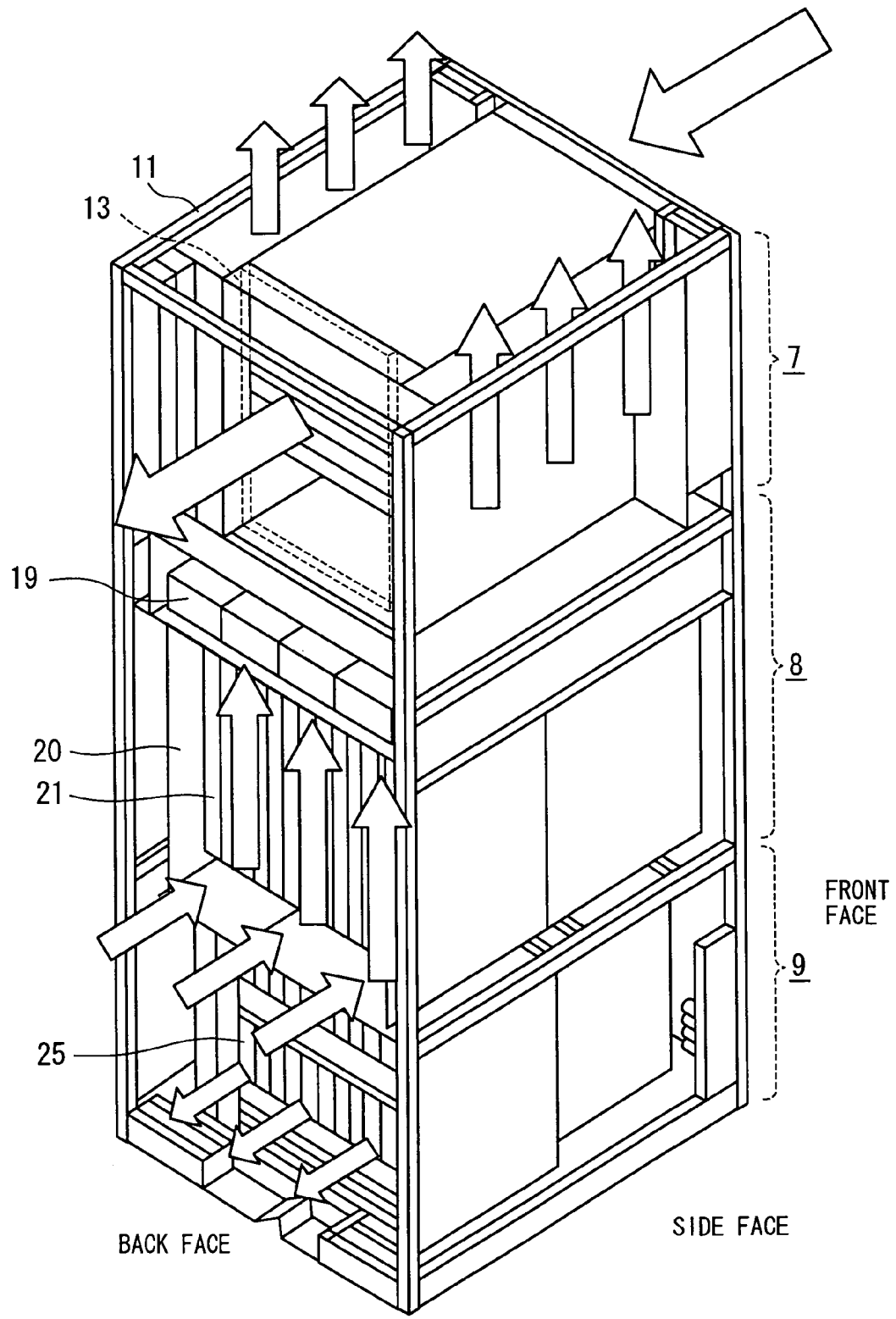
FIG. 3 is a perspective view of the storage control device 1 as seen from its rear.
Figure 4:
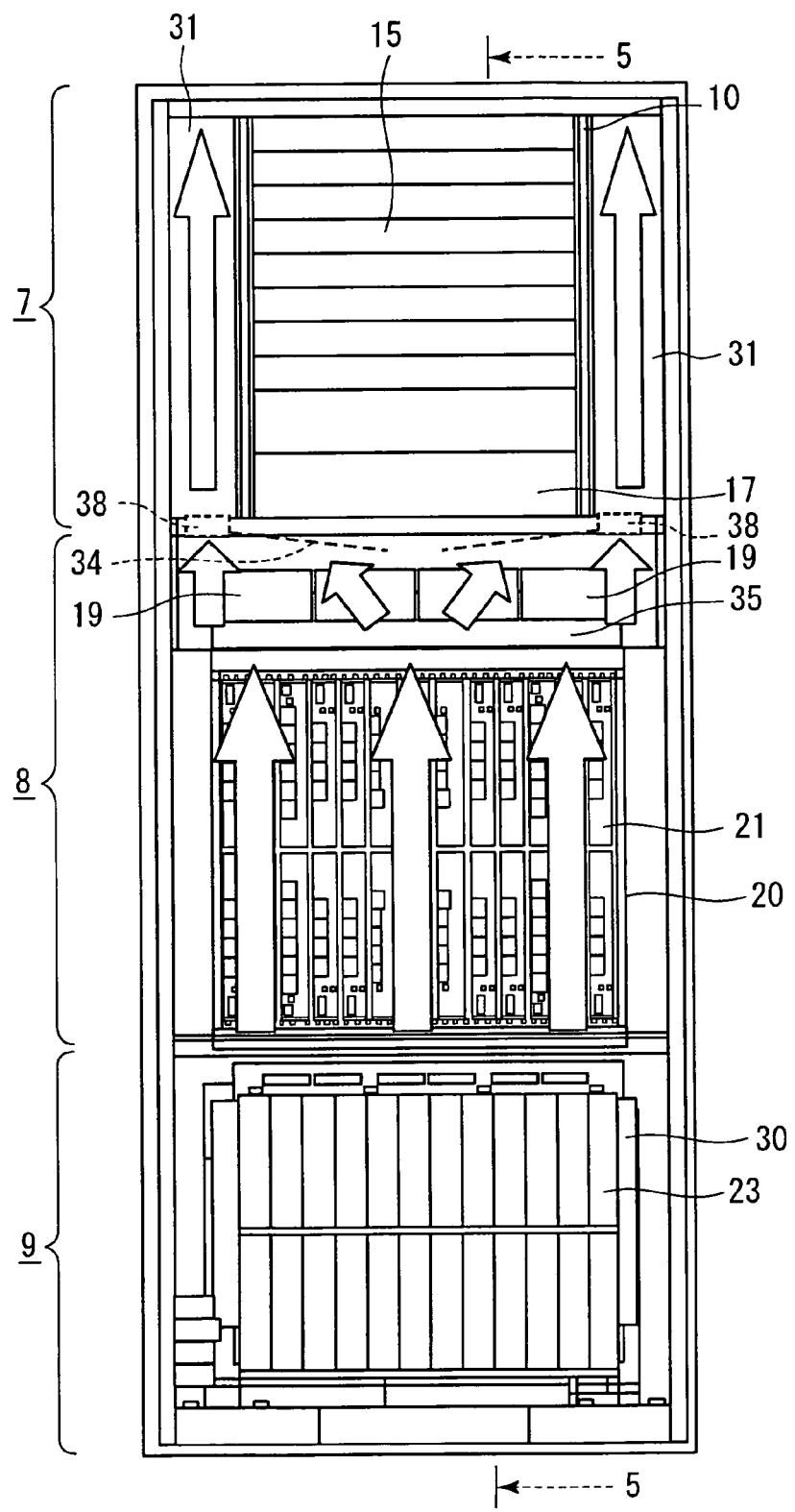
FIG. 4 is an elevation view of the storage control device 1.
Figure 5:
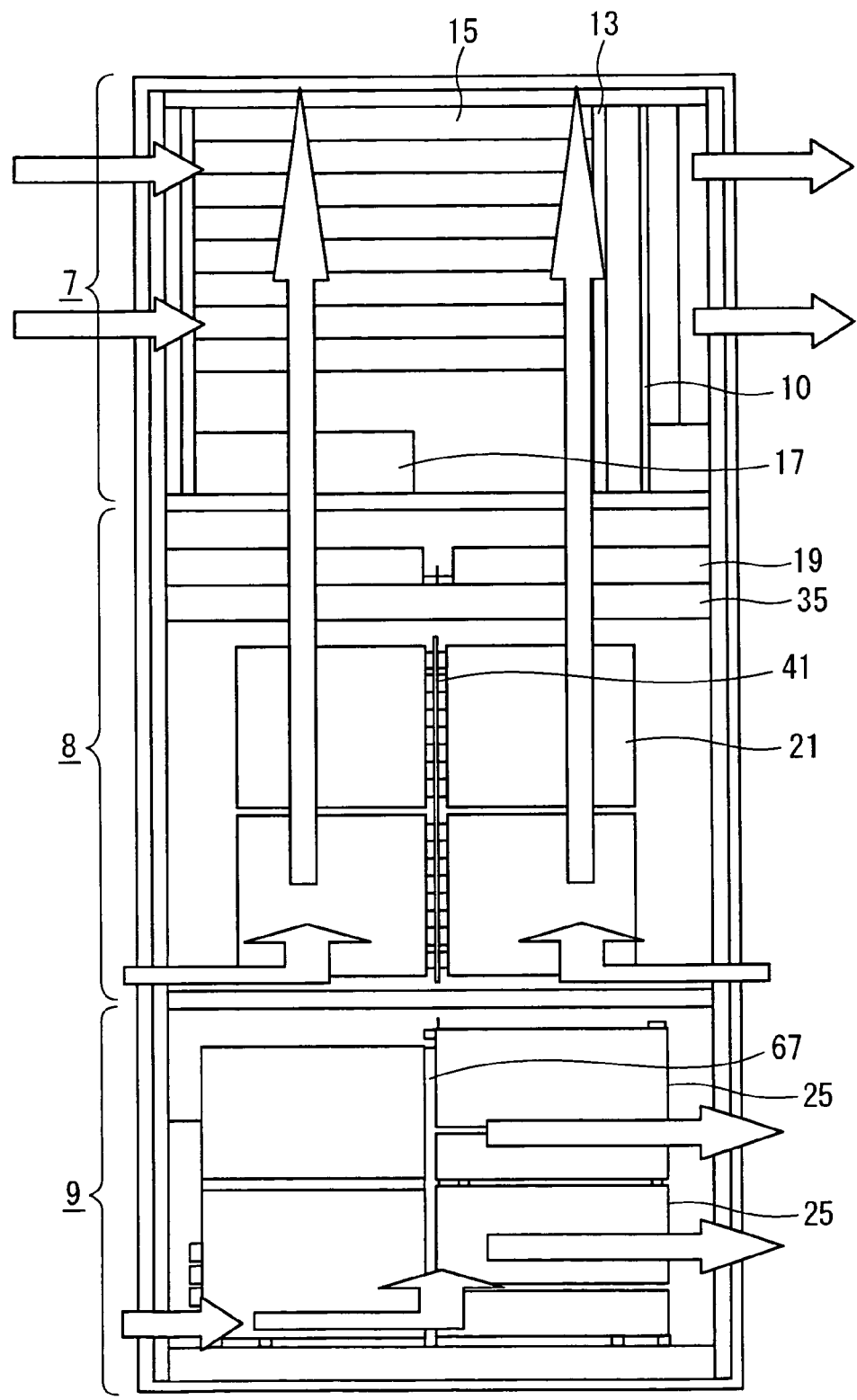
FIG. 5 is a sectional view of the storage control device taken in a plane shown by arrows 5-5 in FIG. 4.

FIG. 2 is a perspective view of the storage control device 1 as seen from its front. FIG. 3 is a perspective view of the storage control device 1 as seen from its rear. FIG. 4 is an elevation view of the storage control device 1. And FIG. 5 is a sectional view of the storage control device 1 taken in a plane shown by the arrows 5-5 in FIG. 4.

The main chassis 11 is substantially a rectangular parallelepiped, and may be divided, from above to below, into a first section 7, a second section 8, and a third section 9. A boundary member (for example a plate) is provided between each section and the neighboring section, for partitioning them from one another.

The first section 7 may be considered as a section in which plate shaped NAS units 15 are mounted (these NAS units 15 will be explained hereinafter). In concrete terms, for example, a NAS box 10 and a NAS back plane 13 may be provided in this first section 7. This NAS box 10 is substantially a rectangular parallelepiped, and at least its surface which faces the front surface of the storage control device 1 is opened. The NAS units 15 are inserted into this NAS box 10 from this surface thereof, and they may be connected to the NAS back plane 13 by being inserted further thereinto in the depthwise direction. This NAS back plane 13 may be, for example, a circuit board on which printed wiring has been formed.

Furthermore, in the first section 7, there may be provided a maintenance terminal 17 (sometimes, by abbreviating "Service Processor", this is termed a SVP) which can be shifted forward and backward in the depthwise direction of the storage control device 1. This maintenance terminal 17 (hereinafter termed a SVP) is, for example, a notebook type personal computer. The SVP 17 may comprise, for example, a control unit (for example, a motherboard on which are mounted a CPU and the like) and an input device (for example, a keyboard). This control unit of the SVP 17 may be provided in the interior of the storage control device 1, and, in the position of the SVP 17, instead of the SVP 17, there may be provided an input device for actuating this control unit. As for its position, the height from the floor surface at which the storage control device 1 is set up may be set to a height at which the user can easily input information using the input device. In concrete terms, for example, this height may be set in the range from 1 m 20 cm to 1 m 30 cm. The SVP 17 may be mounted lower than the plurality of NAS units 15.

Furthermore, spaces 31 for allowing the flow of air (hereinafter termed air flow conduit spaces) are provided in the first section 7, between the plurality of NAS units 15 and the side surfaces of the storage control device 1. In concrete terms, for example, an air flow conduit space 31 is provided at one side at least of both of the sides of the plurality of NAS units 15 (for example at the NAS box 10). Although these air flow conduit spaces 31 may, for example, simply be gaps between the plurality of NAS units 5 and the sides of the storage control device 1, by, as in this embodiment, plates (for example, the sides of the NAS box 10) being provided so as to constitute partitions between the plurality of NAS units 5 and the air flow conduit spaces 31, it is possible to prevent the air which is flowing in these air flow conduit spaces 31 from exerting influence on the cooling of the NAS units 5 (the sides of the NAS box 10 may also, for example, be made from an insulating material). These air flow conduit spaces 31 connect from the lower surface of the first section 7 to the upper surface of the storage control device 1. The air which has entered from the lower surface of the first section 7 into these air flow conduit spaces 31 rises within these spaces 31 and is expelled from the upper surface of the storage control device 1. It should be understood that the air exhaust outlets from the air flow conduit spaces 31 are not limited to being on the upper surface of the storage control device 1; for example, it would also be possible to provide them on the rear surface of the storage control device 1. In this case, the air which has entered into the air flow conduit spaces 31 and has risen therein curves toward the rear enroute, and is expelled from the rear surface of the storage control device 1. These air flow conduit spaces 31 may be, for example, provided-using so called dead space of the first section 7.

In the second section 8, there are comprised a logic box 20, a fan mounting stand 35, and one or a plurality of logic fans 19, 19, . . . .

The logic box 20 is substantially a rectangular parallelepiped, and its surfaces which face the front surface and the rear surface of the storage control device 1 are open. A logic back plane 41 is provided in approximately the middle of the logic box 20, so as to partition the space within the logic box 20 into a front side and a rear side. This logic back plane 41 may be, for example, a circuit board on which printed wiring is formed.

From both the front surface and its rear surface of the logic box 20, logical substrates 21 are inserted within the logic box 20 and are set vertically (i.e. upright) therein, and these logical substrates 21 are connected to both the sides of the logic back plane 41. The logical substrates 21 may be connected so as to be lined up in the width direction of the storage control device 1. In this plurality of logical substrates 21 there may be included, for example, at least one of a disk adapter described hereinafter, a channel adapter, a cache memory, and a common memory.

The fan mounting stand 35 is provided above the logic box 20, and the logic fans 19, 19, . . . are set up on this fan mounting stand 35. One or a plurality of openings (for example holes or slits) may be provided in the upper surface of the logic box 20, or in the fan mounting stand 35, so as to allow air which is sucked in by the logic fans 19, 19, . . . to flow freely.

Furthermore, a certain space is provided in the second section 8 above the logic fans 19, 19, . . . , and this space joins to the above described air flow conduit spaces 31, via the boundary between the first section 7 and the second section 8. In concrete terms, for example, openings 38 (for example holes or slits) are provided at the boundary between the first section 7 and the second section 8, as shown by the dotted lines, and the air which has been expelled from the logic fans 19 can flow into the air flow conduit spaces 31 via these openings 38. It should be understood that, in this second section 8, as shown by the dotted lines, there may be provided flow regulating plates 34 for causing the air which has been expelled from the logic fans 19 to flow into the openings 38 in a smooth manner. Furthermore, instead of or as well as these, various types of guide member may also be provided.

A power supply box 30 is provided in the third section 9. This power supply box 30 is substantially a rectangular parallelepiped, and its sides which face the front surface and the rear surface of the storage control device 1 are open. A power supply back plane 67 is provided in approximately the center of this power supply box 30, so as to partition the space within the power supply box 30 into a front side and a rear side. This power supply back plane 67 may be, for example, a circuit board on which printed wiring has been formed.

Plate shaped batteries 23 are inserted into the power supply box 30 from the front surface of the power supply box 30, and are set up vertically (i.e. upright) therein, and these batteries 23 are connected to one surface of the power supply back plane 67. Furthermore, block shaped power supply sub-boxes 25 are inserted into the power supply box 30 from the rear surface of the power supply block 30, and these power supply sub-boxes 25 are connected to the other surface of the power supply back plane 67.

As described above, in this first embodiment, the subjects for cooling of the same type among the plurality of types of subject for cooling are grouped together, and various sections which correspond to these various groups of types of subjects for cooling are provided to the storage control device 1, with the various groups of types of subjects for cooling being mounted to the sections which correspond to them. In concrete terms, the NAS units 15 comprising NAS head substrates described hereinafter, which are one type of subject for cooling, are mounted in the first section; the logical substrates 21, which are another type of subject for cooling, are mounted in the second section; and the power supply sub-boxes 25 which comprise power supplies, which are yet another type of subject for cooling, are mounted in the third section.

In this first embodiment, the flows of air which cool the subjects for cooling are made to be independent for each of the sections (or, to put it in another manner, for each of the groups of a type of subject for cooling). In other words, the storage control device 1 is so structured, that the air which cools each of the types of subject for cooling does not exert any substantial influence on the cooling of the subjects for cooling of the other types.

In the following, the cooling of the storage control device 1 will be explained in concrete terms with reference to FIGS. 2 through 5. It should be understood that an outline of the flow of air is shown by the thick arrow signs in FIGS. 2 through 5, in order to make it easier to explain the essentials of the air flow. However, the flow of air is not necessarily limited to being as shown by the arrow signs. For example, stagnant pools in the flow of air are caused due to the various members in the storage control device 1 and their temperatures and so on, and the effect thereof is that the air does not flow in straight lines. In concrete terms, although, for example, the arrow signs for the second section 8 indicate that the air which has been sucked in from under the second section 8 turns through a right angle and flows upwards, this is simply for showing that the air which has been sucked in from the lower side of the second section 8 rises and is expelled from the logic fans 19.

Figure 6A:
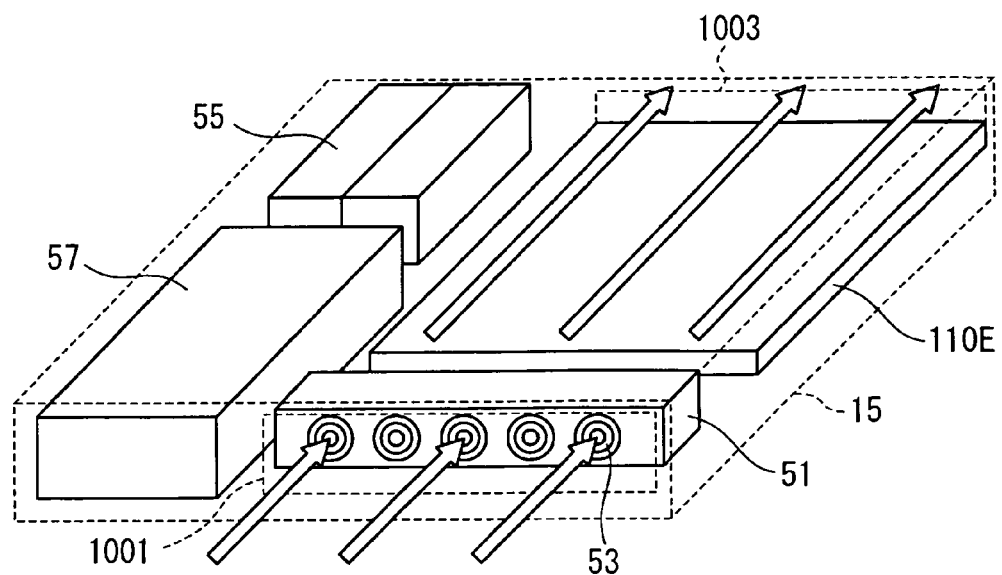
FIG. 6A is a figure showing a structural example of a NAS unit 5.
Figure 6B:
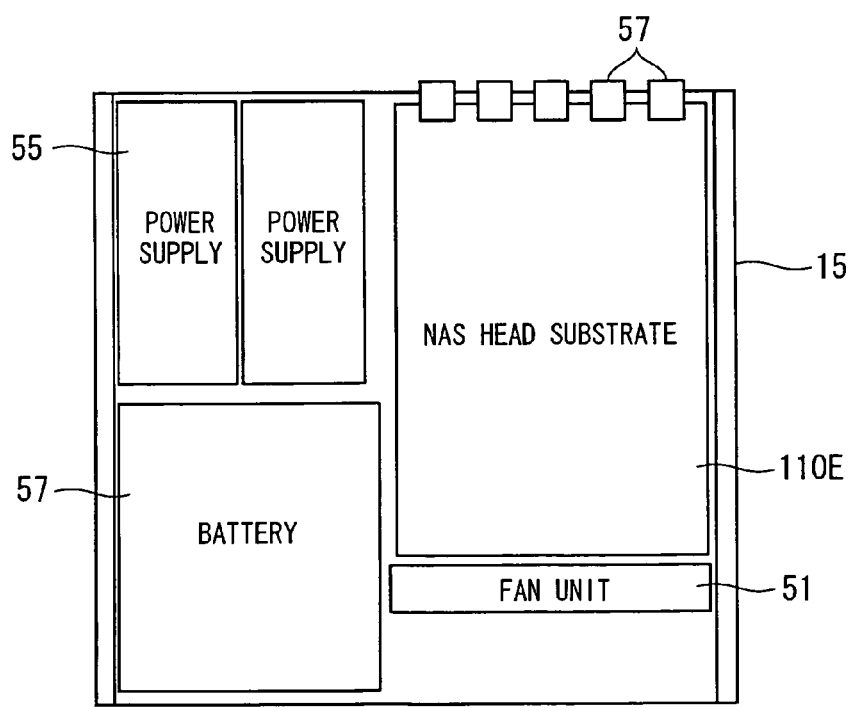
FIG. 6B is a figure showing this NAS unit 5 as seen from above.

Air is sucked into the first section 7 via its front surface from the exterior of the storage control device 1 of, and this sucked in air passes through the NAS units 15 and is expelled from the rear surface of the storage control device 1 to its exterior. In concrete terms, for example, as shown in the example of FIG. 6A, within a NAS unit 15 there are comprised a NAS head substrate 110E, a fan unit 51 which comprises one or more fans (hereinafter termed NAS fans) 53 for cooling the NAS head substrate 110E, and a power supply 55 and a battery 57 for the NAS head substrate 110E and/or the NAS fans 53. The front surface and the rear surface of the NAS unit 15 are made so that air can pass through them (for example, air intake apertures 1001 and air exhaust apertures 1003 may be provided in the front surface and the rear surface). Air is sucked in by the NAS fans 53 from the exterior of the storage control device 15 via its front surface, and this sucked in air is sucked into the NAS unit 15 via the front surface of the NAS unit 15, and this sucked in air flows over the surface of the NAS head substrate 110E and is expelled from the rear surface of the NAS unit 15, with this expelled air being then expelled to the exterior of the storage control device 1 from its rear surface. Since, due to this, the air which has been sucked into the storage control device 1 flows over the NAS head substrate 110E (in particular, for example, over a heat generating portion mounted to this substrate 110E, for example a CPU or a heat sink), accordingly it is able to cool the NAS head substrate 110E (in particular, for example, its heat generation portion). It should be understood that the NAS fans 53 may be fitted more to the front side than the NAS head substrate 110E, as shown in the figure; or, although this is not shown in the figure, they may be fitted more to the rear side than the NAS head substrate 110E.

In the second section 8, air is sucked in from the exterior of the storage control device 1 through its front surface, and, among this sucked in air, the air in the vicinity of the lower portion of the second section 8 rises while progressing through the middle of the storage control device 1, and this air which has risen up is expelled from the second section 8 to the exterior of the storage control device 1. In concrete terms, for example, the air is sucked in by the logic fans 19 from the exterior of the storage control device 15 via its front surface, and, among this sucked in air, the air in the vicinity of the lower portion of the second section 8 rises while progressing through the middle of the storage control device 1, and this air which has risen up is sucked by the logic fans 19 and is expelled upwards therefrom, and this expelled air flows via the holes 38 provided in the division between the first section 7 and the second section 8 into the air flow conduit spaces 31, and is then expelled to the exterior of the storage control device 1. Since, due to this, the air which has been sucked into the storage control device 1 flows over the logical substrates 21 (in particular, for example, over heat generating portions mounted to these logical substrates 21, for example CPUs or heat sinks), accordingly it is able to cool the logical substrates 21 (in particular, for example, their heat generation portions).

Figure 7A:
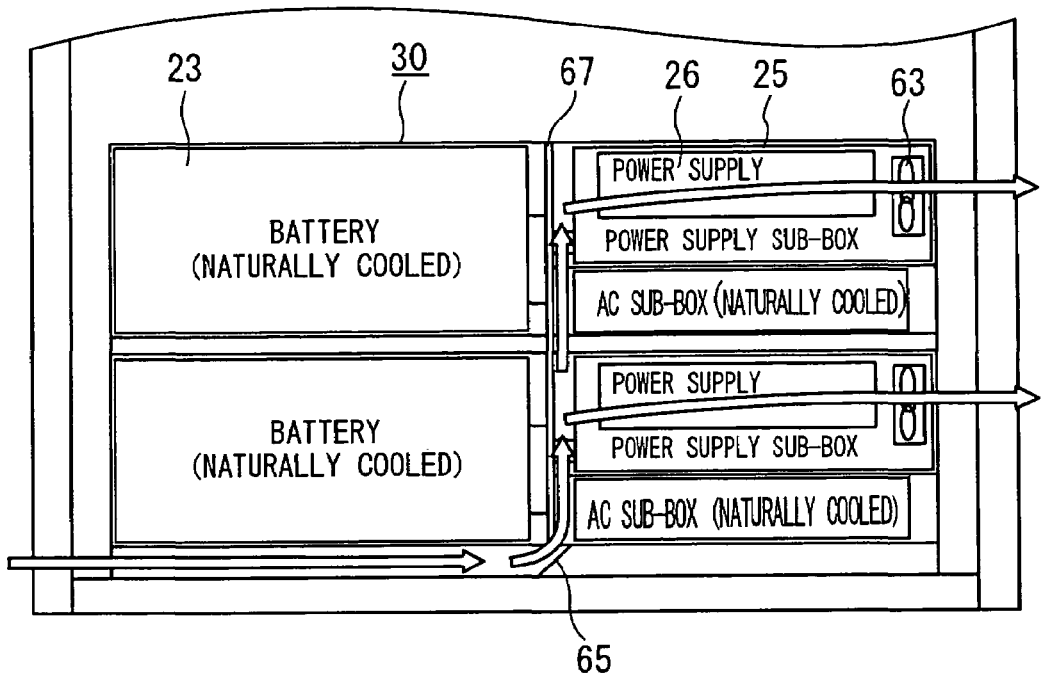
FIG. 7A is a figure showing the air flow in a third section 9, and a structural example of a power supply sub-box 25, in more detail.
Figure 7B:
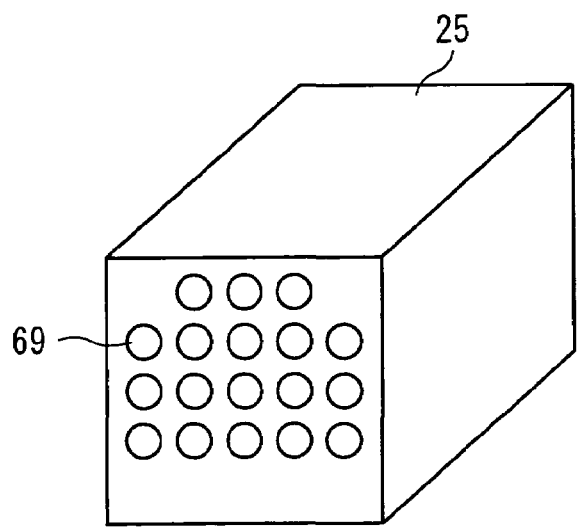
FIG. 7B is a figure showing an example of an elevation view of the power supply sub-box 25.

In the third section 9, air is sucked in from the exterior of the storage control device 1 through its front surface, and this sucked in air passes through the power supply sub-boxes 25 and is expelled from the rear surface of the storage control device 1 to its exterior. In concrete terms, for example, as shown in the example of FIG. 7A, within each of the power supply sub-boxes 25 there are provided a power supply 26 and one or more fans (hereinafter termed power supply fans 63) for cooling this power supply 26. These power supply fans 63 may be provided more toward the rear side (or toward the front side) than the power supply 26. As shown in the example of FIG. 7B, by providing a large number of openings (for example holes) 69 on the front surface (and the rear surface) of the power supply sub-boxes 25, it is arranged for air to be sucked from the front surface of the power supply sub-boxes 25 into their interiors. Thus, air is sucked in from the exterior of the storage control device 15 through its front surface by the power supply fans 63, and this sucked in air is sucked into the interior of the power supply sub-boxes 25 via the front surface of the power supply sub-boxes 25, with the sucked in air then flowing over the outer surfaces of the power supplies 26 and then being expelled from the rear surface of the power supply sub-boxes 25, this expelled air then being expelled from the rear surface of the storage control device 1. Since, by doing this, it is possible for the air which has been sucked into the storage control device 1 to flow over the power supplies 26, accordingly it is possible to cool the power supplies 26. It should be understood that, in this first embodiment, the air which has been sucked in from the front surface of the storage control device 1 proceeds as far as the vicinity of the center of the storage control device 1 by passing underneath the batteries 23, and this air is then directed upwards by the guides 65 which are provided in this central vicinity, so that this air which has risen upwards may be sucked in from the front surfaces of the power supply sub-boxes 25. Since, due to this, it is possible to cool the power supplies 26 with air at a lower temperature than air which has passed past the batteries 23 and has been heated up thereby, accordingly it is possible to suppress deterioration of the cooling efficiency for the power supplies 26.

The above is an explanation of the cooling of this storage control device 1 according to the first embodiment.

Next, examples of the structure and function of the storage device system 4 to which this storage control device 1 is fitted will be described in the following.

Figure 8:
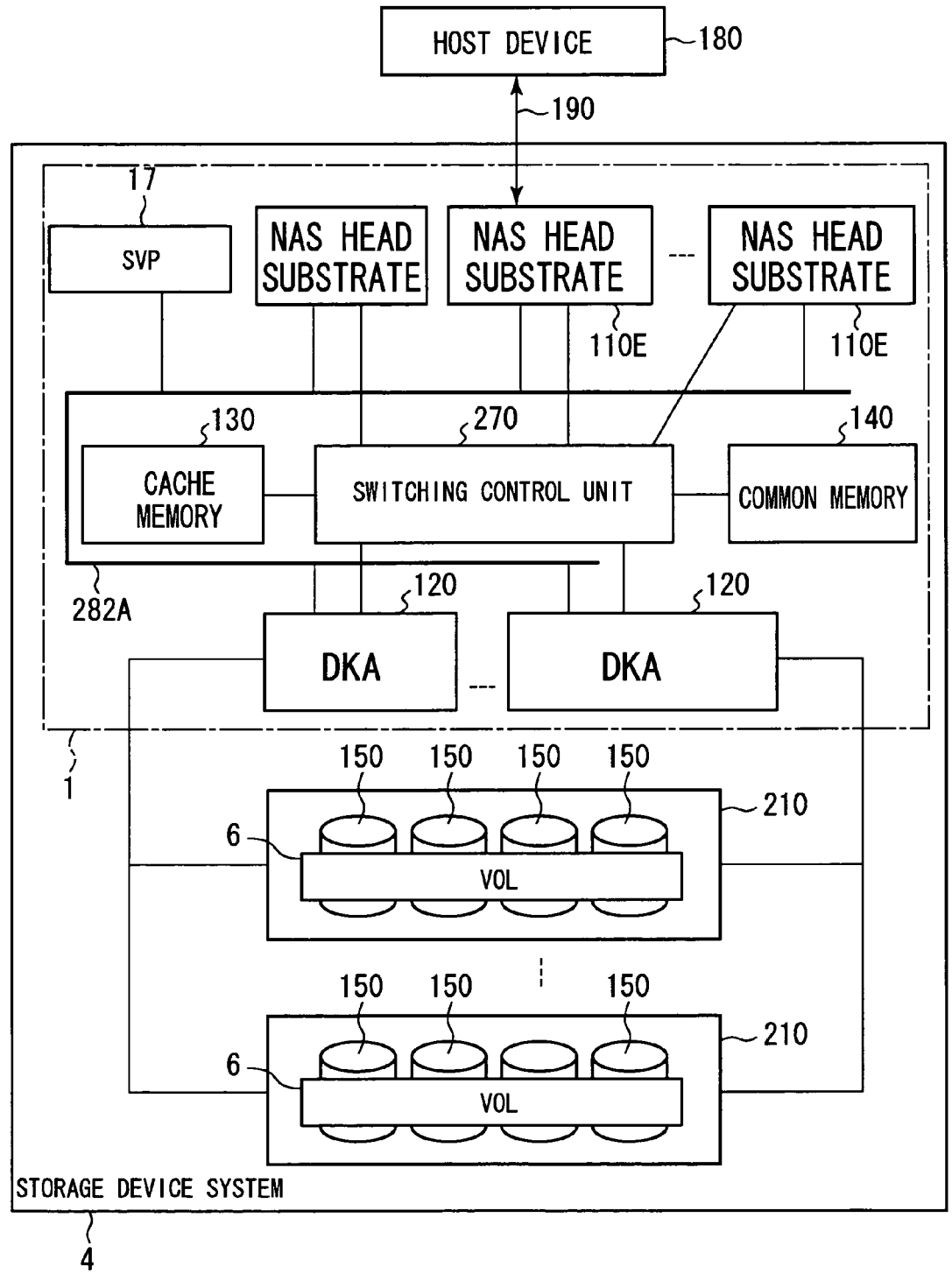
FIG. 8 is a block diagram showing an example of the structure of the storage device system 4.

FIG. 8 is a block diagram showing an example of the structure of the storage device system 4.

This storage device system 4 may, for example, perform storage control according to the RAID (Redundant Array of Independent Disks) method. One or a plurality of RAID groups 210 are fitted within an extension chassis 3. NAS head substrates 110E, one or a plurality of disk adapters 120 (hereinafter termed DKAs), a cache memory 130, a common memory 140, and a switching control unit 270 may be comprised in the storage control device 1.

The RAID groups 210 comprise a plurality of storage devices 150, and provide redundant storage based on a RAID method such as, for example, RAID1 or RAID5 or the like. Each of the storage devices 150 may itself be, for example, a hard disk drive, or may be a device which comprises a hard disk drive within a canister (not shown in the figure). At least one or more logical volumes 6 (hereinafter termed VOLs), which are logical storage regions, may be provided on the physical storage region provided by each of the storage devices 150. A plurality of data items transmitted from a host device 180 may be stored in a VOL 6.

Each of the DKAs 120 is a device which controls data transfer to and from the storage devices 150. These DKAs 120, for example, may be made as micro computer systems including a CPU, ROM, RAM, and the like. A plurality of the DKAs 120 may, for example, be provided within this storage device system 4. Each of the DKAs 120 is able to read out block level data from the cache memory 130 and to write it into the storage devices 150, and to write block level data which it has read out from the storage devices 150 into the cache memory 130.

Each of the NAS head substrates 110E may function as a NAS head. Each of the NAS head substrates 110E receives data from the host device 180 via a connection path 190. This connection path 190 may be a communication network, or may be a dedicated path line. Each of the NAS head substrates 110E may be made as a micro computer system, in the same manner as the DKAs 120. For example, a NAS head substrate 110E may comprise a first CPU which receives file level data from the host device 180 and converts it to block level data, and a second CPU which outputs this block level data after conversion to the cache memory 130.

The cache memory 130 may be made using, for example, volatile or non-volatile semiconductor memory. This cache memory 130 is able to store data from the host device 180, or data which has been read out from a VOL 6.

The common memory 140 may be made using, for example, volatile or non-volatile semiconductor memory. This common memory 140 stores various types of command which it has received from the host device 180, or control information or the like which is used for control of the storage device system 4. This command or control information or the like maybe redundantly stored in a plurality of common memories 140. It should be understood that the cache memory 130 and the common memory 140 may be made as individually separate memories, or may also be made so as to use one portion of a memory as a cache memory region, and another portion of the same memory as a common memory region.

The switching control unit 270, the DKAs 120, the NAS head substrates 110E, the cache memory 130, and the common memory 140 are all mutually connected together. The switching control unit 270, for example, may comprise an ultra high speed crossbar switch or the like.

An SVP 17 is able to collect and to monitor the states of the various sections within the storage device system 4 via, for example, an interior network 282 such as a LAN. This SVP 17 is able to output information about these internal states which it has collected at an external management terminal (not shown in the figure) as raw data just as it is, or as statistically processed data. Furthermore, the SVP 17 is able to receive input of information, to store information which has been inputted in a predetermined storage region (for example a memory) comprised within itself, and to transmit it to the NAS head substrates 110E or to the DKAs 120.

The above concludes the explanation of the first embodiment. It should be understood that, in addition to the NAS head substrates 110E, there may also be provided a channel adapter (hereinafter termed a CHA) which controls communication with the host device 180. Such a CHA may, for example, receive block level data from the host device 180, and write this block level data into the cache memory 130. In this case, the above described logical substrates 21 may constitute the CHA, the DKA 120, the cache memory 130, and the common memory 140.

According to the above described first embodiment, the flows of air which cool the subjects for cooling in each of the sections (to put it in another manner, in each of the groups of a type of subjects for cooling) are made to be independent. In other words, the storage control device 1 is built so that the air which cools the subjects for cooling of each of the various types does not exert any substantial influence on the cooling of the subjects for cooling of the other types. By doing this, it is possible to cool each of the types of subject for cooling in the storage control device 1 in an efficient manner. In concrete terms, for example, it is possible to make the degree of cooling for each of the various different types of subject for cooling different (i.e. to perform temperature control).

Moreover, according to the above described first embodiment, the air flow conduits for each of the various groups of a type of subject for cooling are independent (in other words, the flow conduits are not gathered together), and fans are provided separately for each of the various groups of a type of subject for cooling. Due to this, it is possible to suppress the noise of the fans, since it is sufficient for each fan to be able to cool its own corresponding type of subject for cooling.

Furthermore, according to the above described first embodiment, the NAS head substrates 110E are mounted to a separate section 7 which is divided from the logical substrates 21, so that it may be cooled by a cooling mechanism (in this embodiment, the NAS fans 53) which is different from the cooling mechanism which cools the logical substrates 21 (in this embodiment, the logic fans 19). By doing this, it is possible to perform the cooling in an efficient manner.

Yet further, according to the above described first embodiment, the NAS head substrates 110E are also mounted in a position higher than that of the logical substrates 21. Since, normally, these NAS head substrates 110E are endowed with a higher speed function than the logical substrates 21, accordingly they generate higher temperatures than do the logical substrates 21. Due to this, the temperature of the air which has cooled the NAS head substrates 110E and is expelled to the exterior of the storage control device 1 is presumably higher than the temperature of the air which has cooled the logical substrates 21 and is expelled to the exterior of the storage control device 1. Consequently, if the NAS head substrates 110E were to be mounted in a position lower than that of the logical substrates 21, then it is considered that the air which has cooled the NAS head substrates 110E and is expelled to the exterior of the storage control device 1 and which rises might be sucked into the interior of the storage control device 1 in order to cool the logical substrates 21. In this case, the degree of cooling for the logical substrates 21 might become reduced. Thus by, as in this embodiment, mounting the NAS head substrates 110E in a position higher than that of the logical substrates 21, it is possible to ensure that the degree of cooling for the logical substrates 21 is not reduced.

Still further, according to the above described first embodiment, the plurality of logical substrates 21 are mounted in a position higher than that of the batteries 23 and the power supply sub-boxes 25, and the one or more NAS units 15 are mounted in a position which is still higher than that of the plurality of logical substrates 21. Although the user may demand any type of function from the storage control device 1, in any case, the NAS units 15 are not limited to being fitted so as to fill up the NAS box 10. Due to this, it is considered that the section to which the NAS units 15 are mounted will be lighter than the other sections. Therefore attention is paid, in this first embodiment, in order to make it possible to set up the storage control device 1 with good weight balance.

Even further, according to the above described first embodiment, it is possible to connect the back planes 13, 41, and 67 so that they are capable of communication with other back planes. Moreover, the logic back planes 41 are printed with wiring of a higher density than that of the NAS back planes 13 and the power supply back planes 67. Due to this, openings (for example, holes) are provided in the NAS back planes 13 and in the power supply back planes 67, and it is possible for air to pass through these back planes 13 and 67 via these openings; but it would be difficult to provide such openings in the logic back planes 41. Because of this it is effective to use the method, as in this first embodiment, of not piercing holes in the logic back planes 41 from their front sides to their rear sides, but instead of allowing the air to rise while following along the surfaces of these logic back planes 41.

Moreover, according to the above described first embodiment, air is not sucked in through or blown out through the side surfaces of the storage control device 1. Due to this, it is possible to provide an extension chassis at the side surface of the storage control device 1, so as closely to abut and contact it.

Embodiment Two

In the following, a second preferred embodiment of the present invention will be explained. Principally, at this time, the features of difference with the first embodiment will be explained, while explanation of features in common with the first embodiment will be curtailed or simplified.

In this second embodiment, the storage control device 1 is able to perform different types of cooling control separately for the various types of subject for cooling.

FIG. 9 is an explanatory figure showing an example of a cooling control method in this second embodiment of the present invention.

For example, temperature sensors 59A, 59B, and 59C are provided individually for each of the sections 7, 8, and 9. In concrete terms, for example, a temperature sensor 59A may be provided to each of the NAS units 15. Furthermore, for example, a temperature sensor 59B may be provided within a logic box 20, or in the vicinity of a logic fan 19. Yet further, a temperature sensor 59C may be provided within each of the power supply sub-boxes 25.

A cooling control unit 61 may be provided to the storage control device 1. This cooling control unit 61 may be a hardware circuit, or may be a computer program which is read into a CPU and is executed. The cooling control unit 61 may be, for example, a computer program which is read into and executed by a CPU of a NAS head substrate 110E, a CHA, or a DKA 120.

The cooling control unit 61 receives the temperature which is detected by the temperature sensors 59A, 59B, and 59C, and is able to perform cooling control of the various types of subject for cooling based on these temperatures.

In concrete terms, for example, the cooling control unit 61 is able to control the number of rotations per unit time of the NAS unit fans 53 within the NAS units 15, based on the temperature which has been detected by a temperature sensor 59A. If a plurality of the temperature sensors 59A are present, the cooling control unit 61 may determine within which NAS unit 15 to control the NAS fan 53, or which of the NAS fans 53 to control, according to which of the temperature sensors 59A has detected what temperature.

Furthermore, for example, the cooling control unit 61 may control the number of rotations per unit time of the logic fans 53, based on the temperature which has been detected by the temperature sensor 59B. At this time, the cooling control unit 61 may control the number of rotations per unit time of any one of the logic fans 53.

Moreover, for example, the cooling control unit 61 may control the number of rotations per unit time of the power supply fans 63 within the power supply sub-boxes 25, based on the temperatures which have been detected by the temperature sensors 59C. If a plurality of the temperature sensors 59C are present, the cooling control unit 61 may determine within which power supply sub-box 25 to control the power supply fan 63, according to which of the temperature sensors 59C has detected what temperature.

According to this second embodiment, it is possible to control the cooling separately for each of several subjects for cooling. Although the present invention has been described above in terms of certain preferred embodiments thereof, the present invention is not to be considered as being limited by those embodiments; various changes may be made to the present invention, provided that its scope is not departed from. For example, provided that the air flow conduits in each of the various separate groups of a type of subjects for cooling are independent, it would be acceptable to provide a common air sucking in aperture, or a common air exhaust outlet. Moreover, it would also be possible to mount the storage devices 150 in the first section 7, instead of the NAS units 15.

What is claimed is:

1. A storage control device which controls a storage device, comprising:
    M subjects for cooling including two or more groups of subjects for cooling,
    wherein one of said two or more groups of subjects for cooling includes m subjects for cooling of the same type (where m is a integer greater than or equal to 2, and M>m); and
    two or more cooling mechanisms which respectively correspond to said two or more groups of subjects for cooling,
    wherein each cooling mechanism of said two or more cooling mechanisms is a mechanism for cooling the subjects for cooling included in the corresponding group of subjects for cooling, and is independent from other cooling mechanisms of said two or more cooling mechanisms,
    wherein said two or more groups of subjects for cooling includes first, second, and third groups of subjects for cooling,
    wherein first subjects for cooling which are cooled by a first cooling mechanism corresponding to said first group of subjects for cooling are NAS head substrates or storage devices,
    wherein second subjects for cooling which are cooled by a second cooling mechanism corresponding to said second group of subjects for cooling are logical substrates which are separate from said NAS head substrates,
    wherein third subjects for cooling which are cooled by a third cooling mechanism corresponding to said third group of subjects for cooling are power supplies,
    wherein said storage control device is divided, from above to below, into a plurality of sections,
    wherein said plurality of sections includes:
        a first section in which a plurality of said NAS head substrates or said storage devices are mounted,
        a second section in which a plurality of said logical substrates are mounted, and
        a third section in which said power supplies are mounted,
    wherein said NAS head substrates are mounted horizontally in said first section, and
    wherein said first cooling mechanism sucks in air from the exterior of said storage control device via the front surface of said storage control device, and expels said sucked in air to the exterior of said storage control device from the rear surface of said storage control device.

2. The storage control device according to claim 1, wherein air is sucked into said storage control device by each of said cooling mechanisms of said two or more cooling mechanisms, and said sucked in air cools the subjects for cooling included in the corresponding group of subjects for cooling, and is then expelled to exterior of said storage control device, and
    wherein the air flow conduit for each said cooling mechanism of said two or more cooling mechanisms is independent from air flow conduits for air sucked in by the other cooling mechanisms of said two or more cooling mechanisms.

3. The storage control device according to claim 2, wherein said cooling mechanisms of said two or more cooling mechanisms are provided so that air which has been expelled to the exterior of said storage control device by each of said cooling mechanisms, and whose temperature is higher than that of the sucked in air, is not sucked in by the other cooling mechanisms of said two or more cooling mechanisms.

4. The storage control device according to claim 1,
    wherein each of the NAS head substrates is mounted horizontally, and moreover is provided with one or more NAS heads and a first fan for cooling said one or more NAS heads; and
    wherein said first fan is provided more toward the front side, or the rear side, of said storage control device, than said one or more NAS heads.

5. The storage control device according to claim 1, wherein a first circuit board is provided in said first section, parallel or substantially parallel to the front surface of said storage control device,
    wherein said NAS head substrates are oriented horizontally and connected to said first circuit board;
    wherein on said first circuit board, the plurality of NAS head substrates are arranged along the height direction of said storage control device;
    wherein a second circuit board is provided in said second section, parallel or substantially parallel to the front surface of said storage control device;
    wherein said logical substrates are oriented vertically and connected to both surfaces of said second circuit board;
    wherein on said second circuit board, the plurality of logical substrates are arranged along the width direction of said storage control device;
    wherein a third circuit board is provided in said third section, parallel or substantially parallel to the front surface of said storage control device; and
    wherein said power supplies are connected to said third circuit board.

6. A storage control device which controls a storage device, comprising:
    M subjects for cooling including two or more groups of subjects for cooling, wherein one of said two or more groups of subjects for cooling includes m subjects for cooling of the same type (where m is a integer greater than or equal to 2, and M>m); and two or more cooling mechanisms which respectively correspond to said two or more groups of subjects for cooling, wherein each cooling mechanism of said two or more cooling mechanisms is a mechanism for cooling the subjects for cooling included in the corresponding group of subjects for cooling, and is independent from other cooling mechanisms of said two or more cooling mechanisms, wherein said two or more groups of subjects for cooling includes first, second, and third groups of subjects for cooling, wherein first subjects for cooling which are cooled by a first cooling mechanism corresponding to said first group of subjects for cooling are NAS head substrates or storage devices, wherein second subjects for cooling which are cooled by a second cooling mechanism corresponding to said second group of subjects for cooling are logical substrates which are separate from said NAS head substrates, wherein third subjects for cooling which are cooled by a third cooling mechanism corresponding to said third group of subjects for cooling are power supplies, wherein said storage control device is divided, from above to below, into a plurality of sections, wherein said plurality of sections includes:

a first section in which a plurality of said NAS head substrates or said storage devices are mounted, a second section in which a plurality of said logical substrates are mounted, and a third section in which said power supplies are mounted, wherein, in said first section, an input device for a user to input information to said storage control device is mounted so as to be shiftable both in the rearward direction and the forward direction of said storage control device.

7. The storage control device according to claim 6, wherein said input device is positioned at a height at which said user can easily input said information.

8. The storage control device according to claim 6, wherein air is sucked into said storage control device by each of said cooling mechanisms of said two or more cooling mechanisms, and said sucked in air cools the subjects for cooling included in the corresponding group of subjects for cooling, and is then expelled to exterior of said storage control device, and wherein the air flow conduit for each said cooling mechanism of said two or more cooling mechanisms is independent from air flow conduits for air sucked in by the other cooling mechanisms of said two or more cooling mechanisms.

9. The storage control device according to claim 8, wherein said cooling mechanisms of said two or more cooling mechanisms are provided so that air which has been expelled to the exterior of said storage control device by each of said cooling mechanisms, and whose temperature is higher than that of the sucked in air, is not sucked in by the other cooling mechanisms of said two or more cooling mechanisms.

10. The storage control device according to claim 6, wherein a first circuit board is provided in said first section, parallel or substantially parallel to the front surface of said storage control device, wherein said NAS head substrates are oriented horizontally and connected to said first circuit board;

wherein on said first circuit board, the plurality of NAS head substrates are arranged along the height direction of said storage control device;

wherein a second circuit board is provided in said second section, parallel or substantially parallel to the front surface of said storage control device;

wherein said logical substrates are oriented vertically and connected to both surfaces of said second circuit board;

wherein on said second circuit board, the plurality of logical substrates are arranged along the width direction of said storage control device;

wherein a third circuit board is provided in said third section, parallel or substantially parallel to the front surface of said storage control device; and wherein said power supplies are connected to said third circuit board.

11. The storage control device according to claim 6, wherein a temperature sensor is provided to or in the vicinity of at least one of said first section, said second section, and said third section; and wherein based on the temperature which has been detected by said temperature sensor, said NAS head substrates or said logical substrates control one of said first, second and third cooling mechanisms corresponding to said detected temperature.

12. The storage control device according to claim 6, wherein at least one of said first section, said second section, and said third section comprises a tubular box;

wherein a surface, which is a surface of said tubular box, and which is parallel to at least one of the front surface and the rear surface of said storage control device, is open; and wherein a subject for cooling included in one of said two or more groups of subject for cooling is mounted via said open surface.

13. A storage control device which controls a storage device, comprising:

M subjects for cooling including two or more groups of subjects for cooling, wherein one of said two or more groups of subjects for cooling includes m subjects for cooling of the same type (where m is a integer greater than or equal to 2, and M>m); and two or more cooling mechanisms which respectively correspond to said two or more groups of subjects for cooling, wherein each cooling mechanism of said two or more cooling mechanisms is a mechanism for cooling the subjects for cooling included in the corresponding group of subjects for cooling, and is independent from other cooling mechanisms of said two or more cooling mechanisms, wherein said two or more groups of subjects for cooling includes first, second, and third groups of subjects for cooling, wherein first subjects for cooling which are cooled by a first cooling mechanism corresponding to said first group of subjects for cooling are NAS head substrates or storage devices, wherein second subjects for cooling which are cooled by a second cooling mechanism corresponding to said second group of subjects for cooling are logical substrates which are separate from said NAS head substrates, wherein third subjects for cooling which are cooled by a third cooling mechanism corresponding to said third group of subjects for cooling are power supplies, wherein said storage control device is divided, from above to below, into a plurality of sections, wherein said plurality of sections includes:

a first section in which a plurality of said NAS head substrates or said storage devices are mounted, a second section in which a plurality of said logical substrates are mounted, and a third section in which said power supplies are mounted, wherein said second section is positioned below said first section;

wherein in said second section, said plurality of said logical substrates are arranged along the width direction of said storage control device, with each of said logical substrates being mounted vertically, wherein said second cooling mechanism sucks in air from exterior of said storage control device via at least one of the front surface and the rear surface of said storage control device, and blows said sucked in air from the lower side of said plurality of logical substrates to their tops; and wherein a flow conduit is provided on at least one of the right side and the left side of said plurality of NAS head substrates, along which said air which has flowed to the tops of said plurality of logical substrates flows.

14. The storage control device according to claim 13, wherein—between said first section and said plurality of logical substrates, there is mounted a second fan which sucks in air from the lower side, where said plurality of logical substrates are present, and expels the air upwards; and wherein the air which has been expelled by said second fan passes along said flow conduit which is provided on at least one of the right side and the left side of said plurality of NAS head substrates.

15. The storage control device according to claim 14, wherein a guide member is provided for guiding the air which has been expelled by said second fan to an inlet of said flow conduit.

16. The storage control device according to claim 13, wherein a temperature sensor is provided to or in the vicinity of at least one of said first section, said second section, and said third section; and wherein based on the temperature which has been detected by said temperature sensor, said NAS head substrates or said logical substrates control one of said first, second and third cooling mechanisms corresponding to said detected temperature.

17. The storage control device according to claim 13, wherein at least one of said first section, said second section, and said third section comprises a tubular box;

wherein a surface, which is a surface of said tubular box, and which is parallel to at least one of the front surface and the rear surface of said storage control device, is open; and wherein a subject for cooling included in one of said two or more groups of subject for cooling is mounted via said open surface.

18. The storage control device according to claim 13, wherein a first circuit board is provided in said first section, parallel or substantially parallel to the front surface of said storage control device, wherein said NAS head substrates are oriented horizontally and connected to said first circuit board;

wherein on said first circuit board, the plurality of NAS head substrates are arranged along the height direction of said storage control device;

wherein a second circuit board is provided in said second section, parallel or substantially parallel to the front surface of said storage control device;

wherein said logical substrates are oriented vertically and connected to both surfaces of said second circuit board;

wherein on said second circuit board, the plurality of logical substrates are arranged along the width direction of said storage control device;

wherein a third circuit board is provided in said third section, parallel or substantially parallel to the front surface of said storage control device; and wherein said power supplies are connected to said third circuit board.

19. A storage control device which controls a storage device, comprising:

M subjects for cooling including two or more groups of subjects for cooling, wherein one of said two or more groups of subjects for cooling includes m subjects for cooling of the same type (where m is a integer greater than or equal to 2, and M>m); and two or more cooling mechanisms which respectively correspond to said two or more groups of subjects for cooling, wherein each cooling mechanism of said two or more cooling mechanisms is a mechanism for cooling the subjects for cooling included in the corresponding group of subjects for cooling, and is independent from other cooling mechanisms of said two or more cooling mechanisms, wherein said two or more groups of subjects for cooling includes first, second, and third groups of subjects for cooling, wherein first subjects for cooling which are cooled by a first cooling mechanism corresponding to said first group of subjects for cooling are NAS head substrates or storage devices, wherein second subjects for cooling which are cooled by a second cooling mechanism corresponding to said second group of subjects for cooling are logical substrates which are separate from said NAS head substrates, wherein third subjects for cooling which are cooled by a third cooling mechanism corresponding to said third group of subjects for cooling are power supplies, wherein said storage control device is divided, from above to below, into a plurality of sections, wherein said plurality of sections includes:

a first section in which a plurality of said NAS head substrates or said storage devices are mounted, a second section in which a plurality of said logical substrates are mounted, and a third section in which said power supplies are mounted, and wherein said third cooling mechanism sucks in air from exterior of said storage control device via the front surface of said storage control device, and expels said sucked in air to the exterior of said storage control device from the rear surface of said storage control device.

20. The storage control device according to claim 19, wherein—in said third section, a subject for cooling separate from said power supplies is mounted on the front side of said storage control device, with said power supplies being mounted more to the rear side than said separate subject for cooling; and wherein said third cooling mechanism cools said power supplies with air which has been sucked in from a different location than the location at which said separate subject for cooling is located.

21. The storage control device according to claim 19, wherein air is sucked into said storage control device by each of said cooling mechanisms of said two or more cooling mechanisms, and said sucked in air cools the subjects for cooling included in the corresponding group of subjects for cooling, and is then expelled to exterior of said storage control device, and wherein the air flow conduit for each said cooling mechanism of said two or more cooling mechanisms is independent from air flow conduits for air sucked in by the other cooling mechanisms of said two or more cooling mechanisms.

22. The storage control device according to claim 21, wherein said cooling mechanisms of said two or more cooling mechanisms are provided so that air which has been expelled to the exterior of said storage control device by each of said cooling mechanisms, and whose temperature is higher than that of the sucked in air, is not sucked in by the other cooling mechanisms of said two or more cooling mechanisms.

23. The storage control device according to claim 19, wherein a first circuit board is provided in said first section, parallel or substantially parallel to the front surface of said storage control device, wherein said NAS head substrates are oriented horizontally and connected to said first circuit board;

wherein on said first circuit board, the plurality of NAS head substrates are arranged along the height direction of said storage control device;

wherein a second circuit board is provided in said second section, parallel or substantially parallel to the front surface of said storage control device;

wherein said logical substrates are oriented vertically and connected to both surfaces of said second circuit board;

wherein on said second circuit board, the plurality of logical substrates are arranged along the width direction of said storage control device;

wherein a third circuit board is provided in said third section, parallel or substantially parallel to the front surface of said storage control device; and wherein said power supplies are connected to said third circuit board.

24. The storage control device according to claim 19, wherein a temperature sensor is provided to or in the vicinity of at least one of said first section, said second section, and said third section; and wherein based on the temperature which has been detected by said temperature sensor, said NAS head substrates or said logical substrates control one of said first, second and third cooling mechanisms corresponding to said detected temperature.

25. The storage control device according to claim 19, wherein at least one of said first section, said second section, and said third section comprises a tubular box;

wherein a surface, which is a surface of said tubular box, and which is parallel to at least one of the front surface and the rear surface of said storage control device, is open; and wherein a subject for cooling included in one of said two or more groups of subject for cooling is mounted via said open surface.

26. A storage control device which controls a storage device, comprising:

M subjects for cooling including two or more groups of subjects for cooling, wherein one of said two or more groups of subjects for cooling includes m subjects for cooling of the same type (where m is a integer greater than or equal to 2, and M>m); and two or more cooling mechanisms which respectively correspond to said two or more groups of subjects for cooling, wherein each cooling mechanism of said two or more cooling mechanisms is a mechanism for cooling the subjects for cooling included in the corresponding group of subjects for cooling, and is independent from other cooling mechanisms of said two or more cooling mechanisms, wherein said two or more groups of subjects for cooling includes first, second, and third groups of subjects for cooling, wherein first subjects for cooling which are cooled by a first cooling mechanism corresponding to said first group of subjects for cooling are NAS head substrates or storage devices, wherein second subjects for cooling which are cooled by a second cooling mechanism corresponding to said second group of subjects for cooling are logical substrates which are separate from said NAS head substrates, wherein third subjects for cooling which are cooled by a third cooling mechanism corresponding to said third group of subjects for cooling are power supplies, wherein said storage control device is divided, from above to below, into a plurality of sections, wherein said plurality of sections includes:

a first section in which a plurality of said NAS head substrates or said storage devices are mounted, a second section in which a plurality of said logical substrates are mounted, and a third section in which said power supplies are mounted, wherein said second section is above said third section;

wherein said first section is above said second section;

wherein said NAS head substrates are mounted horizontally in said first section;

wherein said first cooling mechanism sucks in air from the exterior of said storage control device via the front surface of said storage control device, and expels said sucked in air to the exterior of said storage control device from the rear surface of said storage control device;

wherein said plurality of logical substrates are arranged in said second section along the width direction of said storage control device, and each of said logical substrates is mounted vertically;

wherein said second cooling mechanism sucks in air from the exterior of said storage control device via at least one of the front surface and the rear surface of said storage control device, and blows said sucked in air from the lower side of said plurality of logical substrates to their tops;

wherein a flow conduit is provided on at least one of the right side and the left side of said plurality of NAS head substrates, along which said air which has flowed to the tops of said plurality of logical substrates flows; and wherein said third cooling mechanism sucks in air from the exterior of said storage control device via the front surface of said storage control device, and expels said sucked in air to the exterior of said storage control device from the rear surface of said storage control device.

27. The storage control device according to claim 26, wherein air is sucked into said storage control device by each of said cooling mechanisms of said two or more cooling mechanisms, and said sucked in air cools the subjects for cooling included in the corresponding group of subjects for cooling, and is then expelled to exterior of said storage control device, and wherein the air flow conduit for each said cooling mechanism of said two or more cooling mechanisms is independent from air flow conduits for air sucked in by the other cooling mechanisms of said two or more cooling mechanisms.

28. The storage control device according to claim 27, wherein said cooling mechanisms of said two or more cooling mechanisms are provided so that air which has been expelled to the exterior of said storage control device by each of said cooling mechanisms, and whose temperature is higher than that of the sucked in air, is not sucked in by the other cooling mechanisms of said two or more cooling mechanisms.

29. The storage control device according to claim 26, wherein a temperature sensor is provided to or in the vicinity of at least one of said first section, said second section, and said third section; and wherein based on the temperature which has been detected by said temperature sensor, said NAS head substrates or said logical substrates control one of said first, second and third cooling mechanisms corresponding to said detected temperature.

30. The storage control device according to claim 26, wherein at least one of said first section, said second section, and said third section comprises a tubular box;

wherein a surface, which is a surface of said tubular box, and which is parallel to at least one of the front surface and the rear surface of said storage control device, is open; and wherein a subject for cooling included in one of said two or more groups of subject for cooling is mounted via said open surface.

31. A storage control device which controls a storage device, comprising:

a first section in which a plurality of NAS head substrates are mounted, arranged along the height direction of said storage control device, and each oriented horizontally;

a second section in which a plurality of logical substrates are mounted, arranged along the width direction of said storage control device, and each oriented vertically;

a third section in which power supplies are mounted;

a first fan for cooling said plurality of NAS head substrates;

a second fan for cooling said plurality of logical substrates;

a third fan for cooling said power supplies; and a chassis which is shaped as a rectangular parallelepiped or substantially as a rectangular parallelepiped, in which said first section, said second section, said third section, said first fan, said second fan, and said third fan are provided, wherein said second section is above said third section;

wherein said first section is above said second section;

wherein said first fan is a fan for sucking in air from the exterior of said storage control device via the front surface of said storage control device, and for expelling said sucked in air to the exterior of said storage control device from the rear surface of said storage control device;

wherein said second fan is a fan provided between said first section and said second section, and for sucking in air from the exterior of said storage control device via at least one of the front surface and the rear surface of said storage control device, and for blowing said sucked in air from the lower side of said plurality of logical substrates to their tops;

wherein a flow conduit is provided on at least one of the right side and the left side of said plurality of NAS head substrates, along which said air which has been expelled by said second fan flows, with said air passing along said flow conduit and being expelled to the exterior of said storage control device, wherein said third fan is a fan for sucking in air from the exterior of said storage control device via the front surface of said storage control device, and for expelling said sucked in air to the exterior of said storage control device from the rear surface of said storage control devices, and wherein the flow conduit for air blown by each of said first fan, said second fan, and said third fan is independent from the flow conduits for air blown by other fans.

* * * * *